(12) United States Patent
Okita (10) Patent No.: US 11,442,304 B2
(45) Date of Patent: Sep. 13, 2022

(54) ELECTRONIC DEVICE AND LIQUID CRYSTAL DISPLAY DEVICE

(71) Applicant: Japan Display Inc., Tokyo (JP)

(72) Inventor: Mitsutaka Okita, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/305,822

(22) Filed: Jul. 15, 2021

(65) Prior Publication Data

US 2021/0341779 A1  Nov. 4, 2021

Related U.S. Application Data (63) Continuation of application No. PCT/JP2019/045197, filed on Nov. 19, 2019.

(30) Foreign Application Priority Data

Jan. 25, 2019 (JP) .............................. JP2019-010932

(51) Int. Cl.
*G02F 1/1333* (2006.01)
*G02F 1/1335* (2006.01)
*G02F 1/1334* (2006.01)

(52) U.S. Cl.
CPC ........ *G02F 1/13338* (2013.01); *G02F 1/1334* (2013.01); *G02F 1/133504* (2013.01); *G02F 1/133531* (2021.01); *G02F 1/133536* (2013.01)

(58) Field of Classification Search
CPC ........... G02F 1/13338; G02F 1/133531; G02F 1/1334; G02F 1/133504; G02F 1/133536
USPC ......................................... 349/61–68, 96–98
See application file for complete search history.

(56) References Cited

U.S. PATENT DOCUMENTS

| | | |
|---|---|---|
| 2009/0102763 A1 | 4/2009 | Border et al. |
| 2011/0169877 A1* | 7/2011 | Ishida ............... G02F 1/133615 345/690 |
| 2014/0240642 A1 | 8/2014 | Furukawa et al. |
| 2017/0256210 A1* | 9/2017 | Kato ...................... G09G 3/342 |
| 2018/0046052 A1* | 2/2018 | Ju ............. G02F 1/141 |
| 2019/0171045 A1 | 6/2019 | Masuda |
| 2019/0171050 A1* | 6/2019 | Chen ...................... G06V 40/12 |
| 2019/0310724 A1* | 10/2019 | Yeke Yazdandoost ...................... G02F 1/13338 |
| 2020/0064664 A1* | 2/2020 | Cho ........................ G02F 1/1334 |

(Continued)

FOREIGN PATENT DOCUMENTS

| | | |
|---|---|---|
| JP | 07-131766 A | 5/1995 |
| JP | 2009-236987 A | 10/2009 |

OTHER PUBLICATIONS

International Search Report dated Jan. 28, 2020 in PCT/JP2019/045197 filed on Nov. 19, 2019, 2 pages.

*Primary Examiner* — Charles S Chang
(74) *Attorney, Agent, or Firm* — Maier & Maier, PLLC (57) ABSTRACT

An electronic device includes a liquid crystal display panel having a display region disposed with a plurality of pixels, an image sensor disposed on the back side of the liquid crystal display panel and imaging the front direction through the liquid crystal display panel, and a lighting unit disposed between the liquid crystal display panel and the image sensor. The image sensor is disposed in a region overlapping the display region, and the lighting unit includes an optical modulation element disposed to overlap the display region and a light source for lighting the optical modulation element.

9 Claims, 11 Drawing Sheets

(56) References Cited

U.S. PATENT DOCUMENTS

2020/0183222 A1\* 6/2020 Yoon ..................... G02F 1/1334
2021/0366410 A1\* 11/2021 Cho ...................... G02F 1/1335

\* cited by examiner

ELECTRONIC DEVICE AND LIQUID CRYSTAL DISPLAY DEVICE

CROSS REFERENCE TO RELATED APPLICATIONS

This application is based upon and claims the benefit of priority from the prior Japanese Patent Application No. 2019-010932, filed on Jan. 25, 2019, and PCT Application No. PCT/JP2019/045197 filed on Nov. 19, 2019, the entire contents of which are incorporated herein by reference.

FIELD

An embodiment of the present invention relates to an arrangement of an image sensor provided in an electronic device. An embodiment of the present invention relates to the configuration of a liquid crystal display panel and a lighting unit of a liquid crystal display device.

BACKGROUND

Multifunctional cellular phones called smartphones and portable devices without a keyboard, called tablets, are widely used in our social life as electronic devices for digitally processing information and electrically analog-processing video and/or audio. In the case where the screen of the electronic device is provided on the front side, the cameras are mounted on the front side and the rear side. The camera disposed on the front side of the electronic device is disposed in a frame portion of a housing surrounding the screen. It is necessary to secure a certain area of a frame surrounding the screen of the electronic device in order to arrange the camera. Therefore, there is a limit in narrowing the frame portion of the housing, and the mounting of the camera for imaging the front direction is an obstacle to the narrowing of the frame in the electronic device.

Japanese Unexamined Patent Publication No. H7-131766 discloses an imaging and display system in which a video camera is disposed on the back side of a liquid crystal display panel and a subject is photographed through a screen. However, it is necessary to alternately switch between a display mode by the liquid crystal panel and an imaging mode by the video camera, and it is not possible to display and take images at the same time in the image imaging and display system disclosed in Japanese Patent Publication No. H7-131766.

SUMMARY

An electronic device according to an embodiment of the present invention includes a liquid crystal display panel having a display region disposed with a plurality of pixels, an image sensor disposed on the back side of the liquid crystal display panel and imaging the front direction through the liquid crystal display panel, and a lighting unit disposed between the liquid crystal display panel and the image sensor. The image sensor is disposed in a region overlapping the display region, and the lighting unit includes an optical modulation element disposed to overlap the display region and a light source for lighting the optical modulation element.

A liquid crystal display device according to an embodiment of the present invention includes a liquid crystal display panel having a display region disposed with a plurality of pixels, and a lighting unit disposed to overlap the liquid crystal display panel. The lighting unit includes an optical modulation element disposed to overlap the display region, and a light source for illuminating the optical modulation element, and the optical modulation element is configured so that control of a scattering state and a transmission state in a region overlapping the display region is possible.

DESCRIPTION OF EMBODIMENTS

Hereinafter, embodiments of the present invention will be described with reference to the drawings and the like. The present invention may be carried out in various forms without departing from the gist thereof, and is not to be construed as being limited to any of the following embodiments. Although the drawings may schematically represent the width, thickness, shape, and the like of each part in comparison with the actual embodiment in order to clarify the description, they are merely examples and do not limit the interpretation of the present invention. In the present specification and each of the figures, elements similar to those described above with respect to the figures mentioned above are designated by the same reference numerals (or numbers followed by a, b, etc.), and a detailed description thereof may be omitted as appropriate. Furthermore, the characters "first" and "second" appended to each element are convenient signs used to distinguish each element, and have no further meaning unless specifically described.

As used herein, where a member or region is "on" (or "below") another member or region, this includes cases where it is not only directly on (or just under) the other member or region but also above (or below) the other member or region, unless otherwise specified. That is, it includes the case where another component is included in between above (or below) other members or regions.

Figure 1:
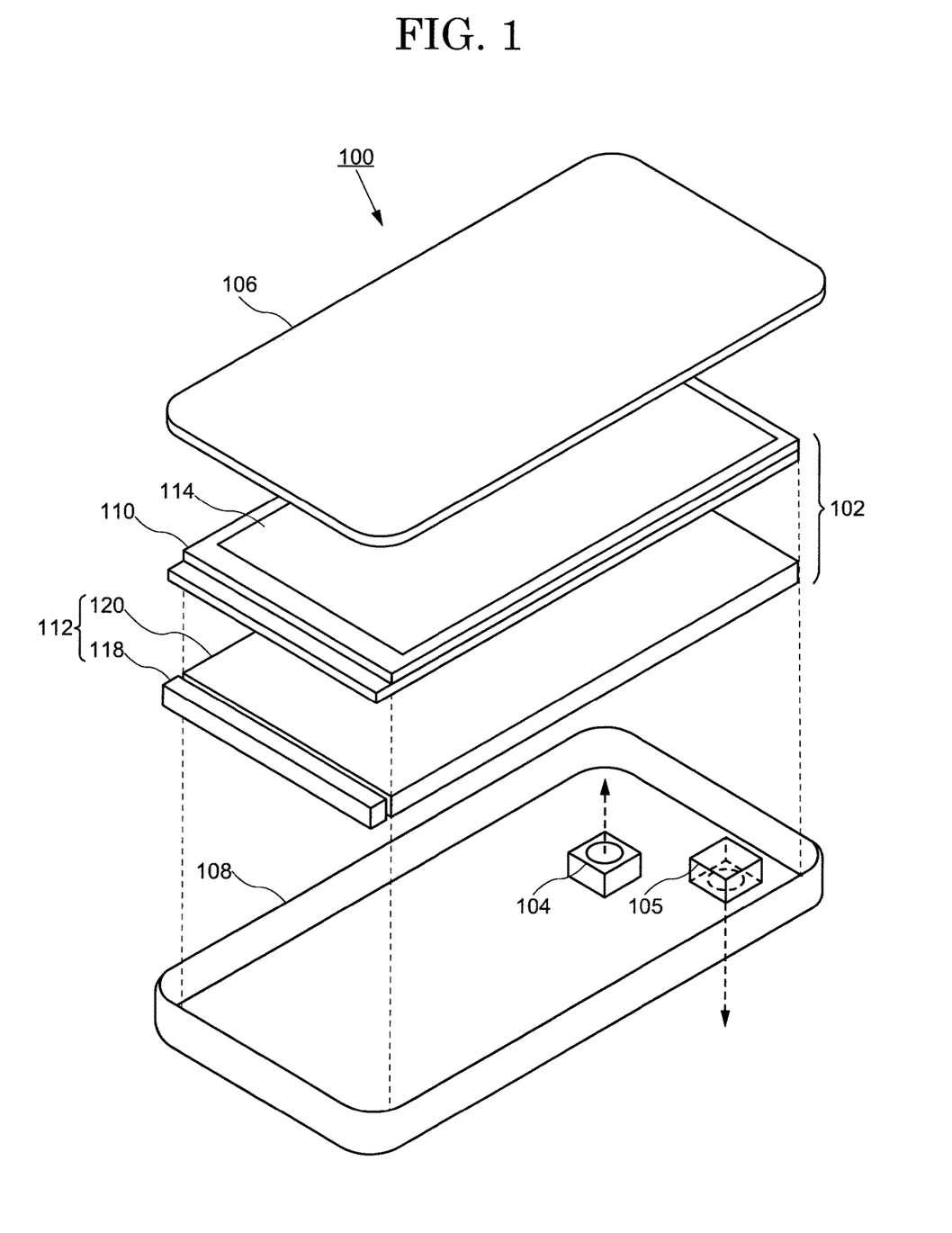
FIG. 1 is a perspective view showing main components of an electronic device according to an embodiment of the present invention.

FIG. 1 is a perspective view showing main components of an electronic device 100 according to an embodiment of the present invention. The electronic device 100 includes a liquid crystal display device 102 and image sensors 104, 105. The liquid crystal display device 102 includes a liquid crystal display panel 110 and a lighting unit 112. The liquid crystal display panel 110 is disposed on the front side of the lighting unit 112, and the lighting unit 112 illuminates the liquid crystal display panel 110 from the back side.

The liquid crystal display panel 110 has a display region 114 in which a plurality of pixels is arranged. The lighting unit 112 includes a light source 118 and an optical modulation element 120. The light modulation element 120 has a planar-shaped light emission surface, and the planar-shaped light emission surface and the liquid crystal display panel 110 are disposed so as to overlap each other. The lighting unit 112 illuminates the display region 114 of the liquid crystal display panel 110 from the back.

In one embodiment of the present invention, the optical modulation element refers to an element that can be controlled between a state that scatters light and a transparent state that does not scatter light. For example, the optical modulation element may be implemented by an element comprising an electro-optic material which has optical properties which vary depending on the electrical energy. The optical modulation element has a function for controlling the distribution of the light intensity in a plane where the light is emitted by such electro-optical effects.

A cover panel 106 as an optional member is disposed on the front surface of the liquid crystal display device 102. The cover panel 106 is formed of a transparent member using glass, plastic, or the like as a material. A screen of an electronic device 100 is formed by a liquid crystal display device 102, and a user visually recognizes the images displayed on the screen through the cover panel 106.

The image sensor 104 is disposed on the back side of the liquid crystal display device 102. The image sensor 104 is disposed at a position overlapping the display region 114. The light receiving surface of the image sensor 104 is directed so as to take images of the front direction of the liquid crystal display 102 (the side where the cover panel 106 is disposed). The light receiving surface of the image sensor 105 is directed so as to take images in of a rear back direction opposite to the image sensor 104. The liquid crystal display device 102 and the image sensors 104, 105 are housed in a housing 108. The image sensor 104 is disposed so as not to be visually recognized from the outside in a state of being housed in the housing 108.

The light source 118 of the lighting unit 112 is disposed on the side surface side of the optical modulation element 120. A light emitting diode (LED), or a cold-cathode tube is used as the light source 118. For example, a plurality of light emitting diodes are disposed as the light source 118 along one side of the optical modulation element 120 formed in a rectangular shape. The light of the light source 118 is incident on the optical modulation element 120 from the side surface. The light incident on the optical modulation element 120 is diffused and scattered inside, and the light is emitted to the side where the liquid crystal display panel 110 is disposed.

The image sensor 104 is disposed in a region overlapping the display region 114 of the liquid crystal display panel 110. The image sensor 104 takes images through the liquid crystal display panel 110 and the optical modulation element 120. The image sensor 104 is formed of, for example, a CCD (Charged Coupled Devices) type image sensor or CMOS (Complementary Metal Oxide Semiconductor) type image sensor.

As described above, in the electronic device 100 according to the embodiment of the present invention, since the image sensor 104 is housed in the housing 108 and the front surface is covered with the liquid crystal display panel 110, the lighting unit 112, and the cover panel 106, the image sensor 104 is not exposed to the outside and is disposed at a position that is not directly viewed by the user. Since the image sensor 104 is not disposed in the frame portion of the housing 108 surrounding the display region 114, the electronic device 100 according to an embodiment of the present invention can be framed narrowly.

Figure 2A:
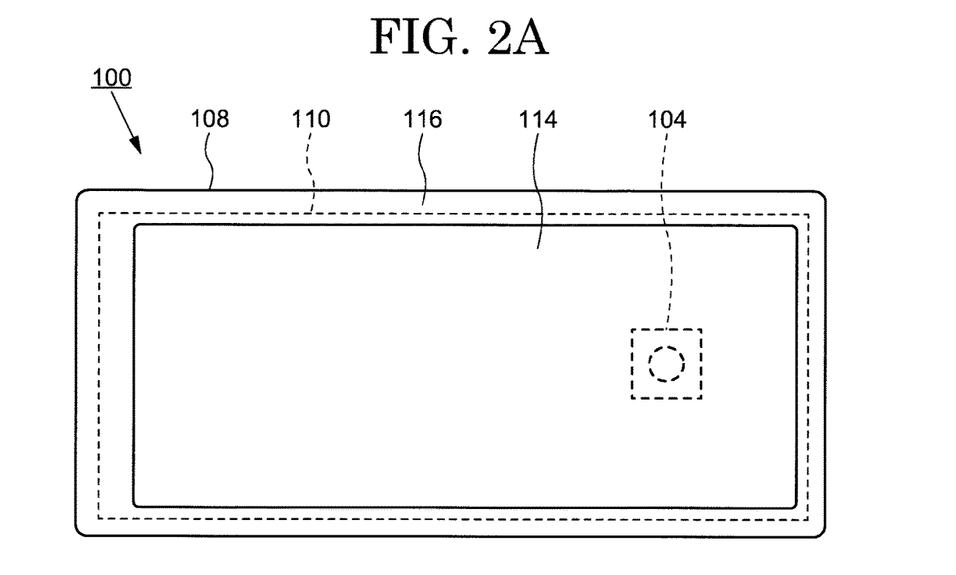
FIG. 2A shows a front view of an electronic device according to an embodiment of the present invention.

FIG. 2A shows a front view of the electronic device 100. The electronic device 100 has a liquid crystal display device 102 and the image sensor 104 overlapping on the back side of a cover panel 106. The liquid crystal display device 102 forms the display region 114 in the plane of the cover panel 106. The area surrounding the display region 114 is a non-display region 116 that does not directly contribute to the display. The non-display region 116 may also be referred to as a frame or frame area since it surrounds the image displayed in the display region 114. FIG. 2A shows an embodiment in which the non-display region 116 is provided to surround the entire periphery of the display region 114. However, this embodiment is an example, and one embodiment of the present invention is not limited to this embodiment. For example, the electronic device 100 may have a configuration in which substantially the entire surface is defined as the display region 114 when viewed directly from the front, and the non-display region 116 is not visible.

The image sensor 104 is not disposed in the non-display region 116, but is disposed in the region overlapping the display region 114. The image sensor 104 is disposed on the back side of the liquid crystal display panel 110 so as not to affect the visual recognition of the image. Therefore, when the image is displayed in the display region 114, the user of the electronic device 100 does not visually recognize the position of the image sensor 104 via the display region 114. The image sensor 104 is disposed at an arbitrary position in the region overlapping the display region 114. For example, the image sensor 104 may be disposed in the center of the display region 114 or may be disposed closer to the periphery of the display region 114. A plurality of image sensors 104 may be disposed inside the display region 114.

Figure 2B:
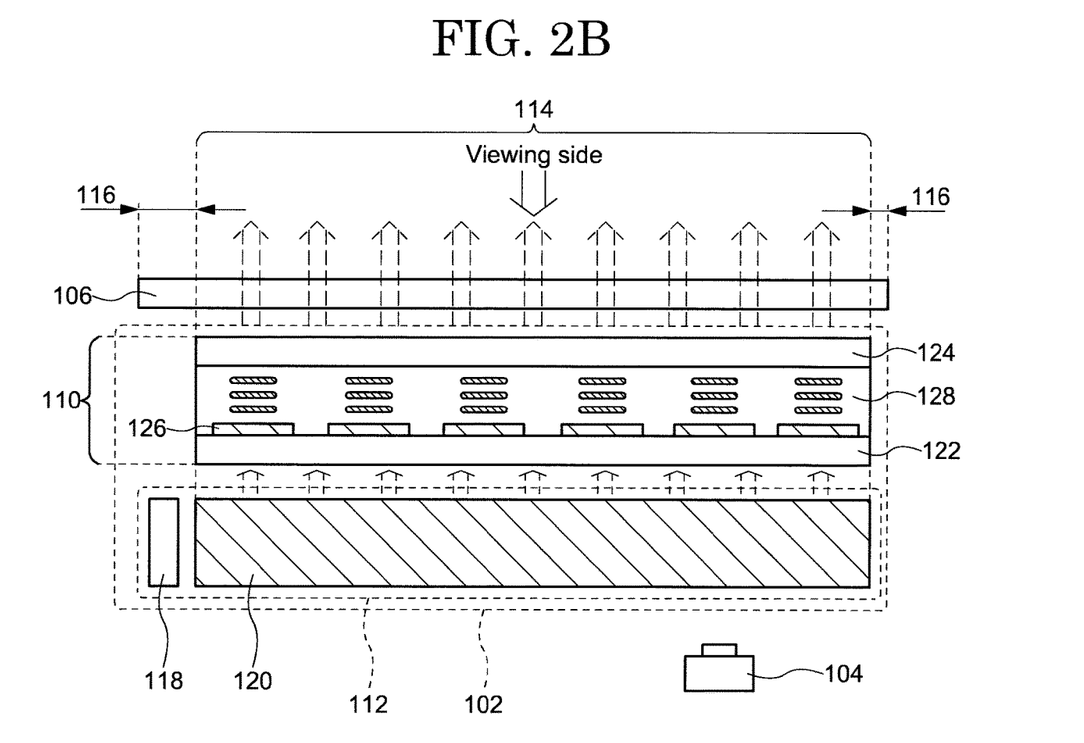
FIG. 2B is a schematic cross-sectional view showing the configuration of an electronic device according to an embodiment of the present invention, and shows the arrangement of a cover panel, a liquid crystal display device, and an image sensor.

FIG. 2B is a schematic sectional view showing the configuration of the electronic device 100. FIG. 2B shows the arrangement of the cover panel 106, the liquid crystal display device 102, and the image sensor 104. The liquid crystal display device 102 includes the liquid crystal display panel 110 and a lighting unit 112. The electronic device 100 has a cover panel 106, a liquid crystal display device 102, and the image sensor 104 overlapping in this order from the viewing side. The lighting unit 112 illuminates the liquid crystal display panel 110 from the back side (the side opposite to the side where the cover panel 106 is disposed) when viewed from the viewing side. The liquid crystal display panel modulates the transmitted light by the electro-optical effect of the liquid crystal and displays the image on the display region 114.

The liquid crystal display panel 110 has a first substrate 122 and a second substrate 124, and a liquid crystal layer 128 is provided between the first substrate 122 and the second substrate 124. The orientation of liquid crystal molecules in the liquid crystal layer 128 is controlled by a pixel electrode 126. The pixel electrode 126 is disposed corresponding to each of the plurality of pixels forming the display region 114. Although not shown in detail in FIG. 2B, the pixel electrode 126 has a structure corresponding to various liquid crystal modes. For example, the pixel electrode 126 has a configuration corresponding to various systems such as IPS (In Plane Switching), VA (Vertical Alignment), MVA (Multi-domain Vertical Alignment), and TN (Twisted Nematic), and the like.

The illumination light incident on the optical modulation element 120 from the light source 118 of the lighting unit 112 is diffused and scattered in plane, and is emitted to the side of the liquid crystal display panel 110. The optical modulation element 120 has a function for electrically controlling a part or the entire surface between a scattering state for scattering light and a transmission state for transmitting light.

The image sensor 104 is disposed on the back surface side of the liquid crystal display device 102 (the surface opposite to the surface on which the cover panel 106 is disposed). Since the image sensor 104 is disposed in a region overlapping the display region 114, at least the liquid crystal display panel 110 and the optical modulation element 120 are disposed in front of the image sensor 104 (on the imaging side). When the optical modulation element 120 is in the scattering state, external light (light incident from the outside of the cover panel 106) is scattered by the optical modulation element 120, and at least direct light does not enter the image sensor 104. Therefore, when the optical modulation element 120 is controlled to be in the scattering state, the image sensor 104 cannot image the front of the liquid crystal display panel 110. On the other hand, when the optical modulation element 120 is controlled to be in the transmission state, external light can be made incident on the image sensor 104. Therefore, the electronic device 100 can appropriately display and take images by controlling the optical state of the optical modulation element 120.

Next, the basic operation of the electronic device 100 will be described.

FIG. 2B shows a state in which the image is displayed on the entire surface of the display region 114. In this state, the light illuminates the entire surface of the display region 114 of the liquid crystal display panel 110 by the optical modulation element 120. In this state, the image sensor 104 cannot image the front of the liquid crystal display panel 110 since the optical modulation element 120 in the front is controlled to the scattering state. Therefore, such a state in the electronic device 100 can be referred to as a non-imaging mode.

Figure 3:
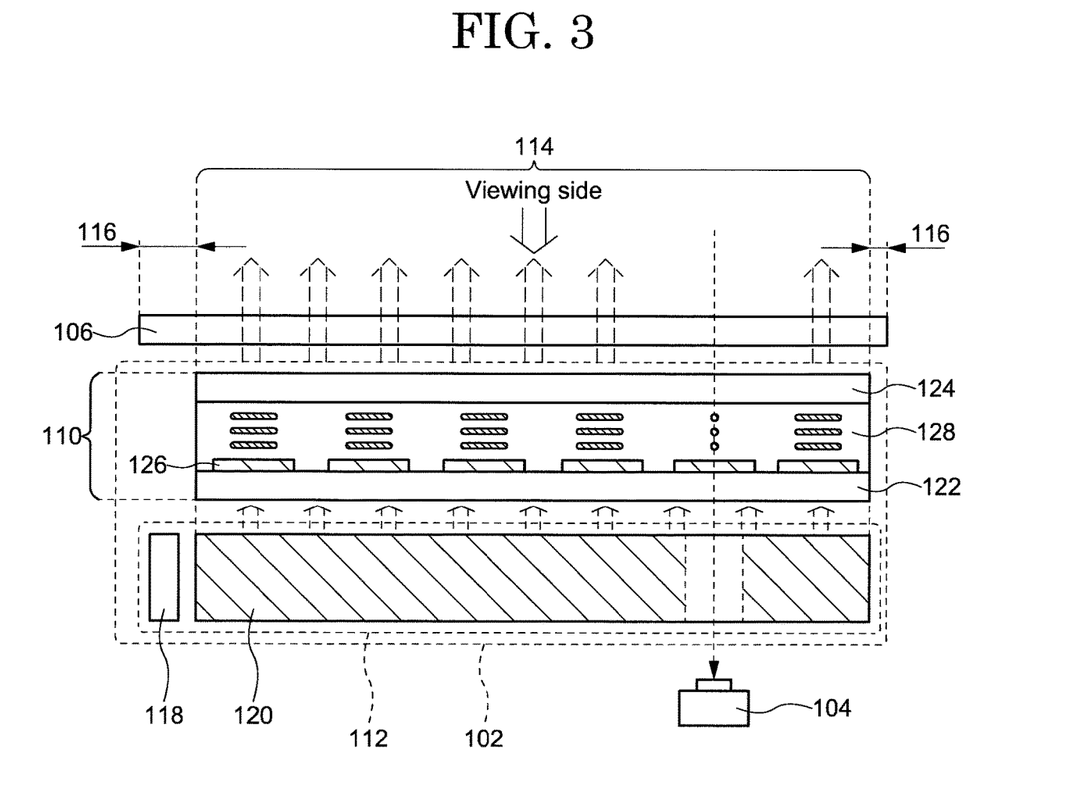
FIG. 3 is a schematic cross-sectional view showing the configuration of an electronic device according to an embodiment of the present invention, and shows the arrangement of a liquid crystal display device and an image sensor and a state when the image sensor is imaging.

FIG. 3 shows the optical state of the optical modulation element 120 controlled from the scattering state to the transmission state in the region overlapping the image sensor 104 (the front region of the image sensor 104). As shown in FIG. 3, the optical modulation element 120 is not entirely in the transmission state, but is controlled to partially form the transmission state so that external light can be made incident on the imaging surface of the image sensor 104. Therefore, this state in the optical modulation element 120 can also be called a partial transmission state. FIG. 3 shows a state in which the orientation of the liquid crystal is controlled so that pixels in a region of the liquid crystal display panel 110 which overlap with the image sensor 104 are white (the transmission state). With such control, external light enters the image sensor 104 from the viewing side through the liquid crystal display panel 110 and the optical modulation element 120. In this state, the image sensor 104 can take images of the front direction of the liquid crystal display panel 110. Therefore, such a state in the electronic device 100 can be called an imaging mode.

Note that, even in the imaging mode, in the region that does not overlap the image sensor 104, the optical modulation element 120 can maintain the scattering state, and the liquid crystal display panel 110 can display the image in the display region 114. Therefore, in the imaging mode, not only imaging but also display of images can be performed simultaneously.

Figure 4A:
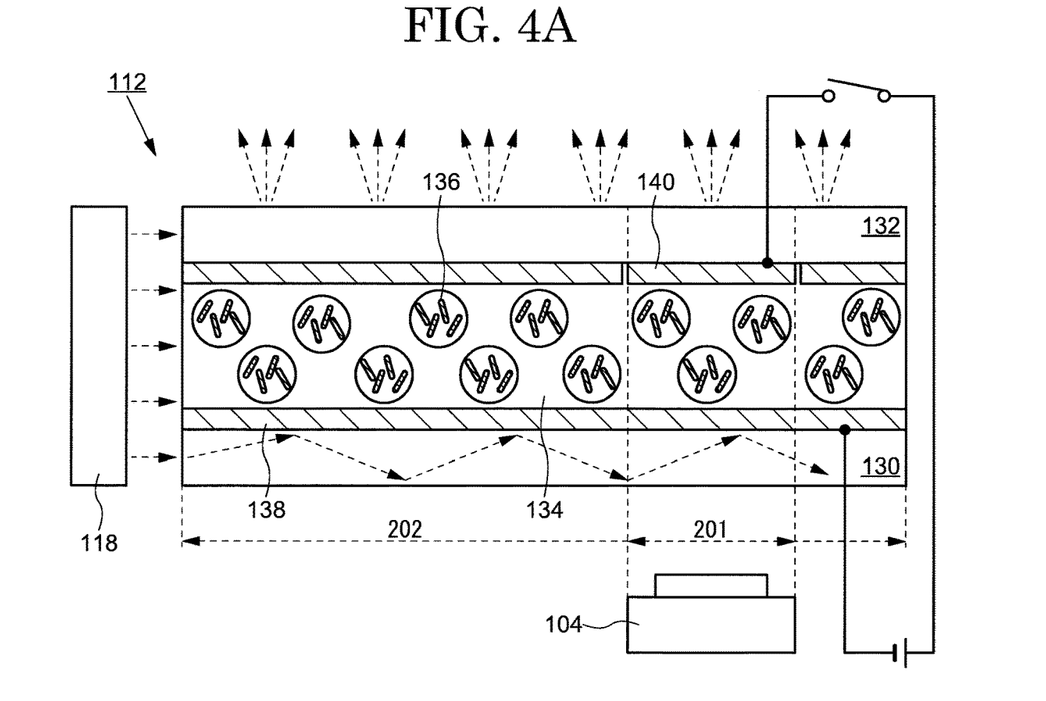
FIG. 4A is a cross-sectional view illustrating an operation of a lighting unit provided in an electronic device according to an embodiment of the present invention, and shows a state in a non-imaging mode.
Figure 4B:
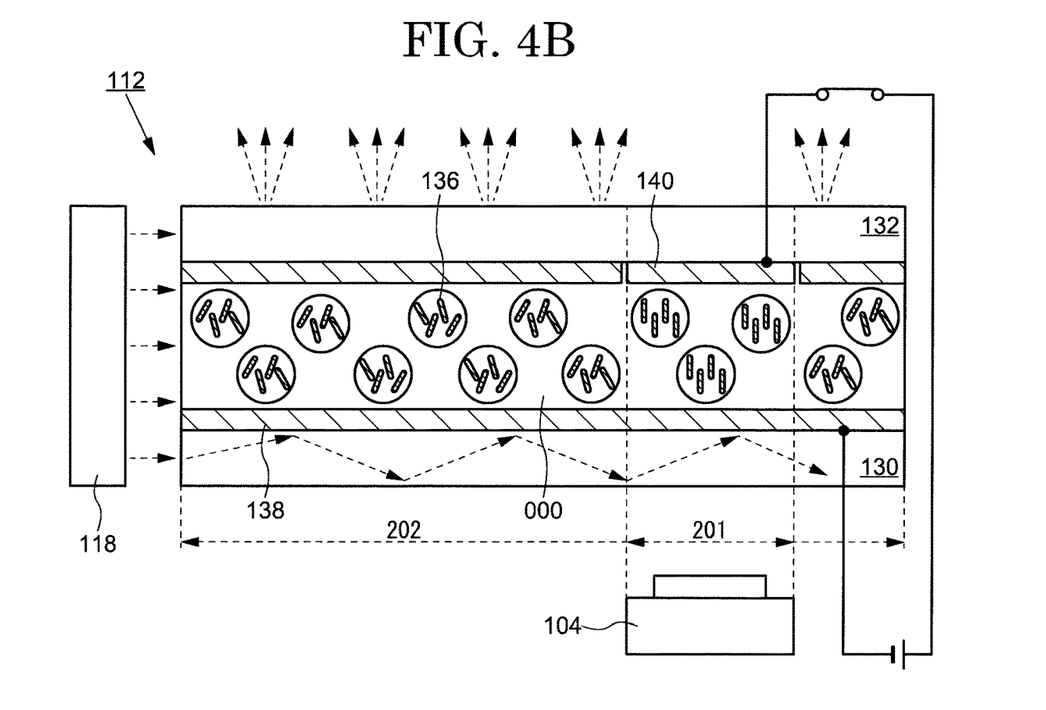
FIG. 4B is a sectional view illustrating an operation of a lighting unit provided in an electronic device according to an embodiment of the present invention, and shows a state in an imaging mode.

FIG. 4A and FIG. 4B are cross-sectional views illustrating the operation of the lighting unit 112. FIG. 4A shows a state in the non-imaging mode, and FIG. 4B shows a state in the imaging mode. The optical modulation element 120 has a configuration in which a dimming layer 134 is disposed between a third substrate 130 and a fourth substrate 132 disposed opposite to the third substrate 130. The third substrate 130 is disposed with a first electrode 138, and the fourth substrate 132 is disposed with a second electrode 140. Both the first electrode 138 and the second electrode 140 are formed of a transparent conductive film. The first electrode 138 is provided as a common electrode extending substantially over the entire surface of the third substrate 130, and the second electrode 140 is provided corresponding to a position where the image sensor 104 is disposed, and is electrically isolated from other regions. In the following description, it is assumed that the region where the first electrode 138 and the second electrode 140 overlap in the optical modulation element 120 is referred to as a first region 201, and the other regions are referred to as a second region 202.

The dimming layer 134 has a property of forming at least two states, the scattering state for scattering light and a transparent state for transmitting light. The dimming layer 134 is formed by using, for example, a polymer dispersed liquid crystal. The polymer dispersed liquid crystal is formed by forming a network structure of a polymer in the liquid crystal. The polymer dispersed liquid crystal has an effect of scattering light by inducing an irregular state of the arrangement of liquid crystal molecules 136 by the action of a polymer network. On the other hand, when a voltage is applied to the polymer dispersed liquid crystal to orient the liquid crystal molecules 136 in one direction, the polymer dispersed liquid crystal exhibits an action of transmitting the light without scattering the light. Polymer dispersed liquid crystals are classified into a normally white type in which a voltage is applied to change from the scattering state to the transparent state, and a normally black type (also called a reverse mode) in which a voltage is applied to change from a transparent state to the scattering state. In one embodiment of the present invention, the dimming layer 134 may be composed of both normally white and normally black polymer dispersed liquid crystals.

FIG. 4A shows a case where the dimming layer 134 is provided in a normally white type of polymer dispersed liquid crystal. FIG. 4A also shows the non-imaging mode in which no voltage is applied between the first electrode 138 and the second electrode 140. In this state, the dimming layer 134 is in the scattering state in both the first region 201 and the second region 202. That is, the liquid crystal molecules 136 of the polymer dispersed liquid crystal are oriented in random directions and are in a state of scattering light. Therefore, the light incident from the light source 118 to the optical modulation element 120 is diffused and scattered in the dimming layer 134 and is irradiated toward the liquid crystal display panel 110.

FIG. 4B shows the imaging mode. FIG. 4B shows a state in which a voltage is applied between the first electrode 138 and the second electrode 140 in the first region 201, and voltage is not applied to the second region 202. In the dimming layer 134, the first region 201 is changed to the transparent state, and the second region 202 maintains the scattering state. That is, the liquid crystal molecules 136 of the polymer dispersed liquid crystal are oriented in one direction by the effect of an electric field in a region sandwiched between the first electrode 138 and the second electrode 140. Since the orientation of the liquid crystal molecules 136 is aligned in the first region 201, the light scattering effect is reduced and the first region 201 becomes transparent.

As a result, the first region 201 located in front of the image sensor 104 of the optical modulation element 120 turns transparent so that external light can enter. On the other hand, since the liquid crystal molecules 136 in the second region 202 are still randomly oriented, the scattering state is maintained. As a result, the second region 202 can illuminate the liquid crystal display panel 110, and the liquid crystal display panel 110 can display the image in a region corresponding to the second region 202.

Thus, the lighting unit 112 can switch between the non-imaging mode and the imaging mode by partially controlling the scattering state and the transparent state using the optical modulation element 120. In the imaging mode, it is possible for the liquid crystal display panel 110 to perform imaging by the image sensor 104 while displaying the image in the display region 114.

The second electrode 140 is not disposed as an individual electrode distinguished from other regions, but may be formed on substantially the entire surface of the fourth substrate 132. According to this configuration, the entire optical modulation element 120 is simultaneously controlled to the scattering state and the transparent state. In this case, the electronic device 100 can alternately display the image by the liquid crystal display panel 110 and take images by the image sensor 104. The optical modulation element 120 may have a passive matrix type electrode structure. Since the optical modulation element 120 includes a passive matrix type electrode, the scattering state and the transparent state can be controlled in a region corresponding to the first region 201.

Figure 5:
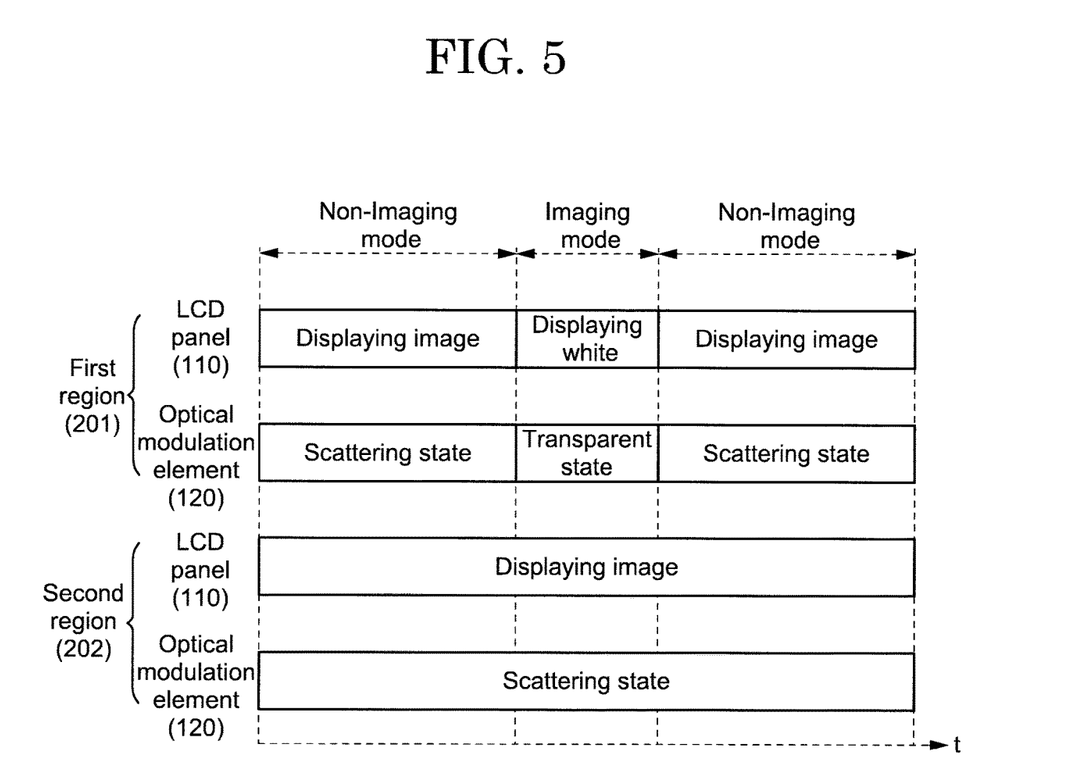
FIG. 5 is a diagram for explaining an operation of an electronic device according to an embodiment of the present invention.

FIG. 5 shows an operation of the electronic device according to an embodiment of the present invention. FIG. 5 shows the operation states of the liquid crystal display panel 110 and the optical modulation element 120 in the first region 201 and the second region 202, respectively.

As shown in FIG. 5, in a state where the electronic device 100 displays the image with the liquid crystal display panel 110 (the non-imaging mode), both the first region 201 and the second region 202 of the optical modulation element 120 are the scattering state. In the imaging mode in which images are taken by the image sensor 104, the first region 201 of the optical modulation element 120 is in the transparent state and the second region 202 is maintained in the scattering state. The liquid crystal display panel 110 in the imaging mode is driven in the same manner as when the pixels of the region corresponding to the first region 201 are perform a white display. Specifically, in each of the pixels of the red (R) pixel, the green (G) pixel, and the blue (B) pixel disposed in the region corresponding to the first region 201, the orientation of the liquid crystal molecules is controlled so that the illumination light of the lighting unit 112 is transmitted. As a result, the first region 201 is in a state in which external light can enter, and the image sensor 104 can take images. On the other hand, also in the imaging mode, the scattering state of the optical modulation element 120 is maintained in the second region 202. Therefore, the display region 114 of the liquid crystal display panel 110 corresponding to the second region 202 can display images.

Figure 6:
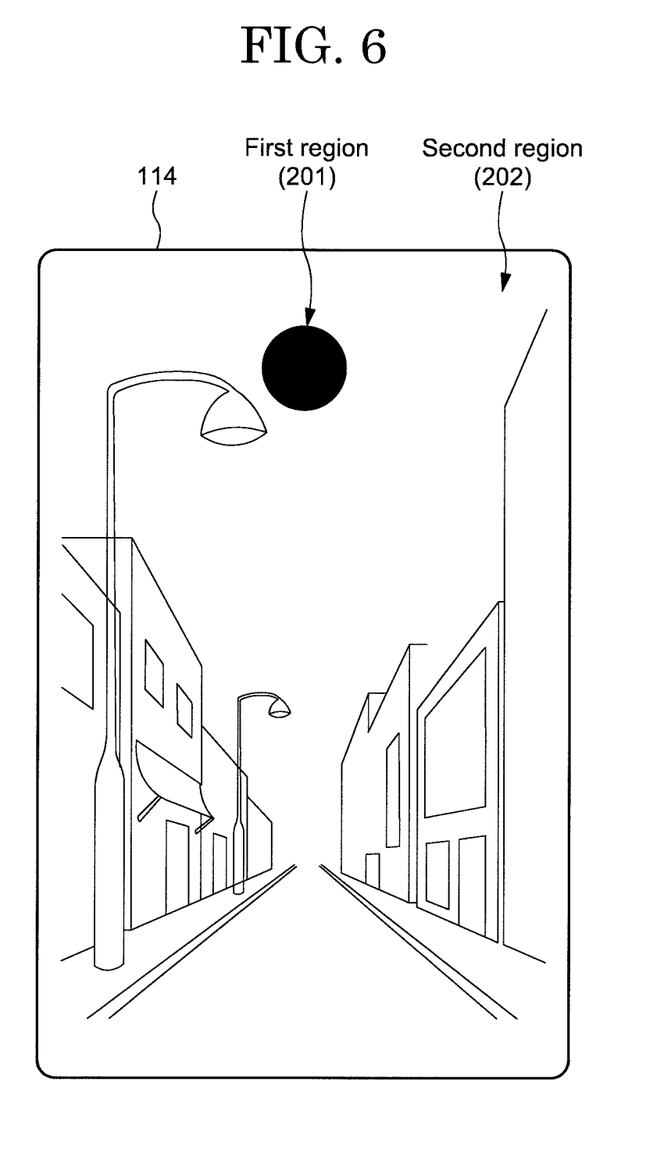
FIG. 6 is a diagram showing an example of an image displayed in a display region in an imaging mode in an electronic device according to an embodiment of the present invention.

FIG. 6 shows the imaging mode. The display region 114 is visually recognized as black since the region corresponding to the first region 201 is not illuminated by the optical modulation element 120. The region corresponding to the second region 202 displays images. External light enters the first region 201, and the imaging element 104 is in a state in which it is possible to take images. The shape of the first region 201 is arbitrary and is not limited to the shape shown in FIG. 6.

Thereafter, when the mode is switched to the non-imaging mode, the first region 201 of the optical modulation element 120 changes to the scattering state. The liquid crystal display panel 110 displays image in regions corresponding to the first region 201 and the second region 202.

Figure 7:
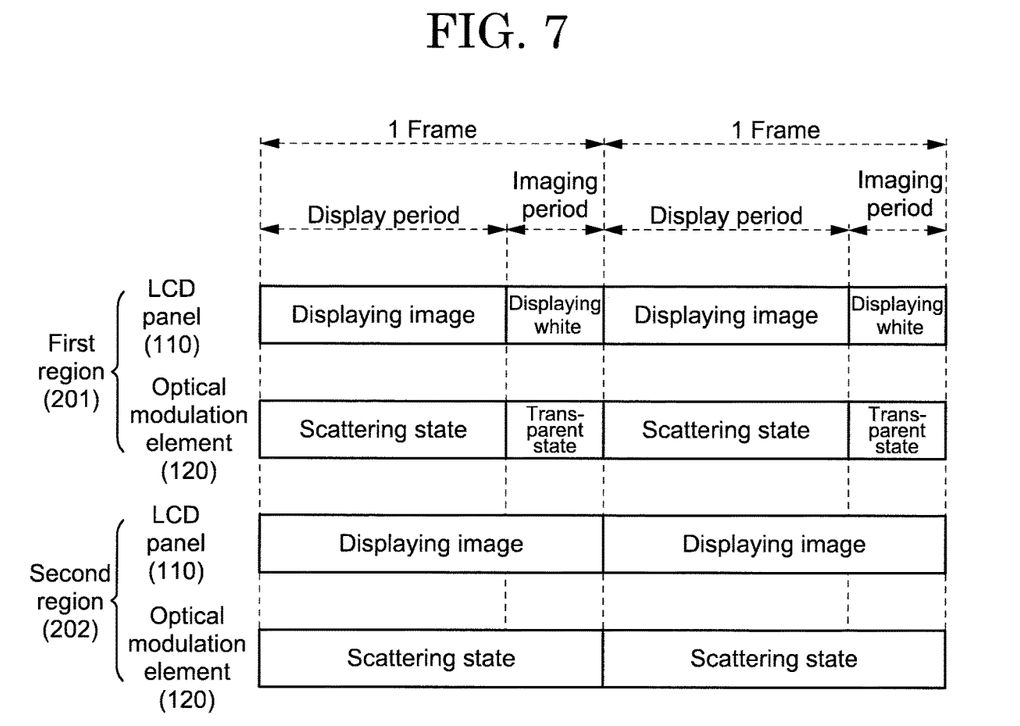
FIG. 7 is a diagram for explaining an operation of an electronic device according to an embodiment of the present invention.

FIG. 7 shows an example of an operation in which the electronic device 100 takes images while displaying images. FIG. 7 shows operations of the liquid crystal display panel 110 and the optical modulation element 120 in each of the first region 201 and the second region 202 for each frame.

As shown in FIG. 7, when the electronic device 100 takes images by the image sensor 104, an image display period and an imaging period are included in one frame. Specifically, the liquid crystal display panel 110 is configured to include the image display period during which the image is displayed and the imaging period during which the pixels are driven to perform white display (In the display region 114, since it is not illuminated by the optical modulation element 120, it is visually recognized as a black display as shown in FIG. 6.) within one frame in the first region 201. The first region 201 of the optical modulation element 120 is controlled to be in the scattering state and the transparent state in synchronization with the operation of the liquid crystal display panel 110. The second region 202 of the liquid crystal display panel 110 displays the image, and the optical modulation element 120 is controlled to the scattering state.

When the frame frequency of the liquid crystal display panel 110 is 60 Hz, the time per frame is 16.7 msec. Here, if the shutter speed of the image sensor 104 is $1/1000$ second, even if the imaging period is 1 msec, the imaging period can be provided in one frame without affecting the display of the image. Although FIG. 7 shows an example in which the imaging period is provided after the image display period, the imaging period can be arbitrarily provided within one frame. For example, the imaging period may be provided at the beginning of one frame period or at the middle of one frame period.

As described above, since the imaging period is inserted in one frame period, imaging can be performed while displaying any image on the entire surface of the display region 114 of the electronic device 100. Since the imaging period is set to a partial time within one frame period, imaging can be performed without affecting the user's vision.

Figure 8:
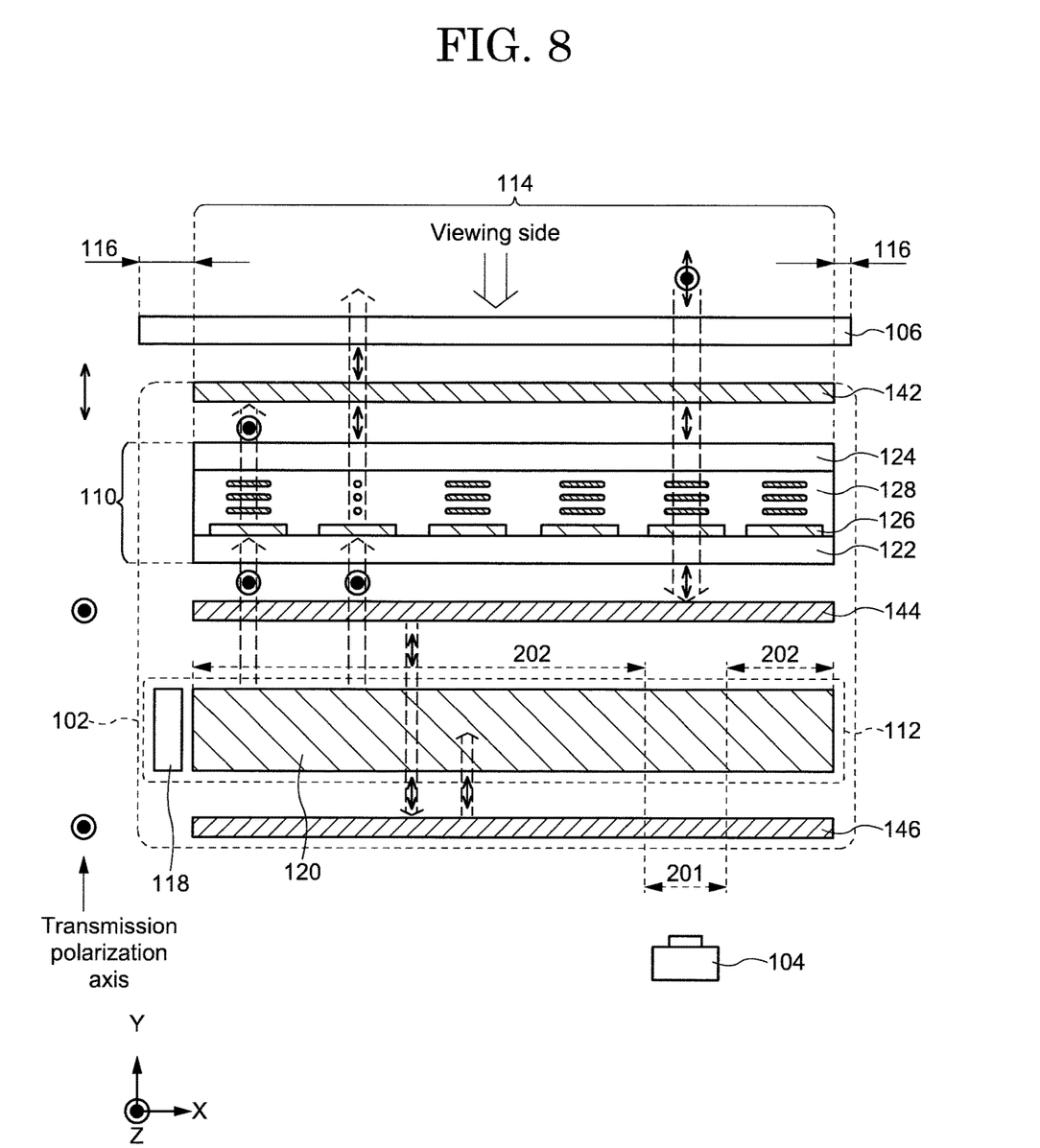
FIG. 8 is a diagram for explaining an operation of an electronic device according to an embodiment of the present invention.

FIG. 8 shows the relationship between the polarizing plate disposed in the liquid crystal display device 102 and the emitted light and the external light of the lighting unit 112. A transmissive polarizing plate 142 is disposed on the surface of the liquid crystal display panel 110 of the liquid crystal display device 102 on the cover panel 106 side, and a first reflective polarizing plate 144 is disposed on the surface of the lighting unit 112 side. A second reflective polarizing plate is disposed between the lighting unit 112 and the image sensor 104.

FIG. 8 shows an X axis, a Y axis, and a Z axis. As shown in FIG. 8, a first direction is a direction along the Y axis, a second direction is a direction along the Z axis orthogonal to the Y axis direction, and a third direction is a direction along the X axis orthogonal to the Y axis direction and the Z axis direction. When the X axis, the Y axis, and the Z axis are similarly shown in other drawings, they are treated in the same manner.

The transmissive polarizing plate 142 has a transmission polarization axis in the first direction. The first reflective polarizing plate 144 is disposed to have the transmission polarization axis in the second direction orthogonal to the first direction and a reflection polarization axis in the first direction. That is, the transmissive polarizing plate 142 and the first reflective polarizing plate 144 have transmission polarization axes arranged in a cross Nicol manner. The second reflective polarizing plate 146 is arranged to have the transmission polarization axis in the second direction crossing the first direction and the reflection polarization axis in the first direction. Namely, the first reflective polarizing plate 144 and the second reflective polarizing plate 146 are arranged so that the transmission polarization axes are parallel to each other.

FIG. 8 also shows a case where the liquid crystal layer 128 of the liquid crystal display panel 110 is a lateral electric field system. In this case, it is assumed that the liquid crystal molecules are oriented in the first direction when a predetermined voltage is not applied to the pixel electrode 126 and are oriented in the second direction when a predetermined voltage is applied.

The light emitted from the light source 118 is scattered by the optical modulation element 120, and a part of the light is irradiated to the liquid crystal display panel 110. A polarization component parallel to the transmission polarization axis of the first reflective polarizing plate 144 of the irradiation light is transmitted and irradiated to the liquid crystal display panel 110. On the other hand, the light reflected by the first reflective polarizing plate 144 is not transmitted to the image sensor 104 since the polarization axis intersects the transmission polarization axis of the second reflective polarizing plate 146. Therefore, The image sensor 104 is disposed in a state where it is difficult to be affected by the illumination light emitted the lighting unit 112.

Illumination light to the liquid crystal display panel 110 enters the liquid crystal layer 128. Each pixel of the liquid crystal display panel 110 is disposed with a pixel electrode 126. Since the polarization axis of illumination light does not change in the pixel to which a voltage for orienting liquid crystal molecules is not applied to the pixel electrode 126, the polarization direction is in a state orthogonal to the transmission polarization axis of the transmissive polarizing plate 142, and is not emitted to the viewing side. On the other hand, in the pixel to which a voltage for orienting liquid crystal molecules is applied to the pixel electrode 126, the polarization axis is twisted by 90 degrees when the irradiation light passes through the liquid crystal layer 128, so that the polarization axis becomes parallel to the transmission polarization axis of the transmissive polarizing plate 142 and is emitted to the viewing side. In this way, the liquid crystal display device 102 controls the voltage of each pixel to display the image in the display region 114. At this time, since the liquid crystal display device 102 is disposed with the second reflective polarizing plate 146, even when an image is displayed on the display region 114, the image sensor 104 can be prevented from being affected.

Figure 9:
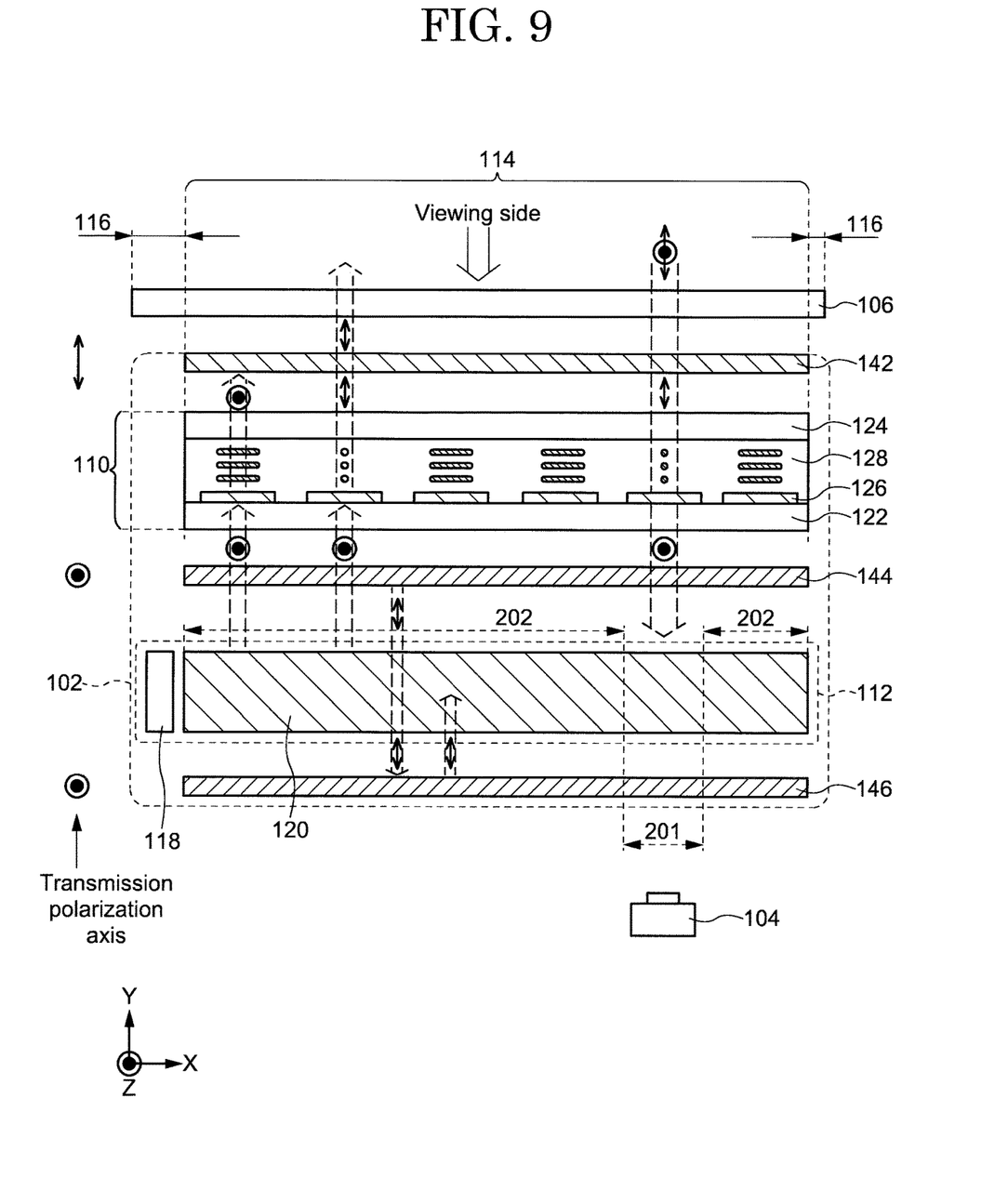
FIG. 9 is a diagram for explaining an operation of an electronic device according to an embodiment of the present invention.

FIG. 9 shows a state in which a voltage for orienting liquid crystal molecules is applied to pixels arranged in a region corresponding to the first region 201 overlapping the image sensor 104, and the entire optical modulation element 120 is controlled to the scattering state. The polarization axis of the external light passing through the pixels arranged in the region corresponding to the first region 201 is twisted by 90 degrees in the liquid crystal layer 128. As a result, the polarization axis of the transmitted light that has passed through the liquid crystal display panel 110 becomes parallel to the transmission polarization axis of the first reflective polarizing plate 144. In this state, external light is applied to the optical modulation element 120. However, since the optical modulation element 120 is controlled to the scattering state, the external light does not directly reach the image sensor 104.

Figure 10:
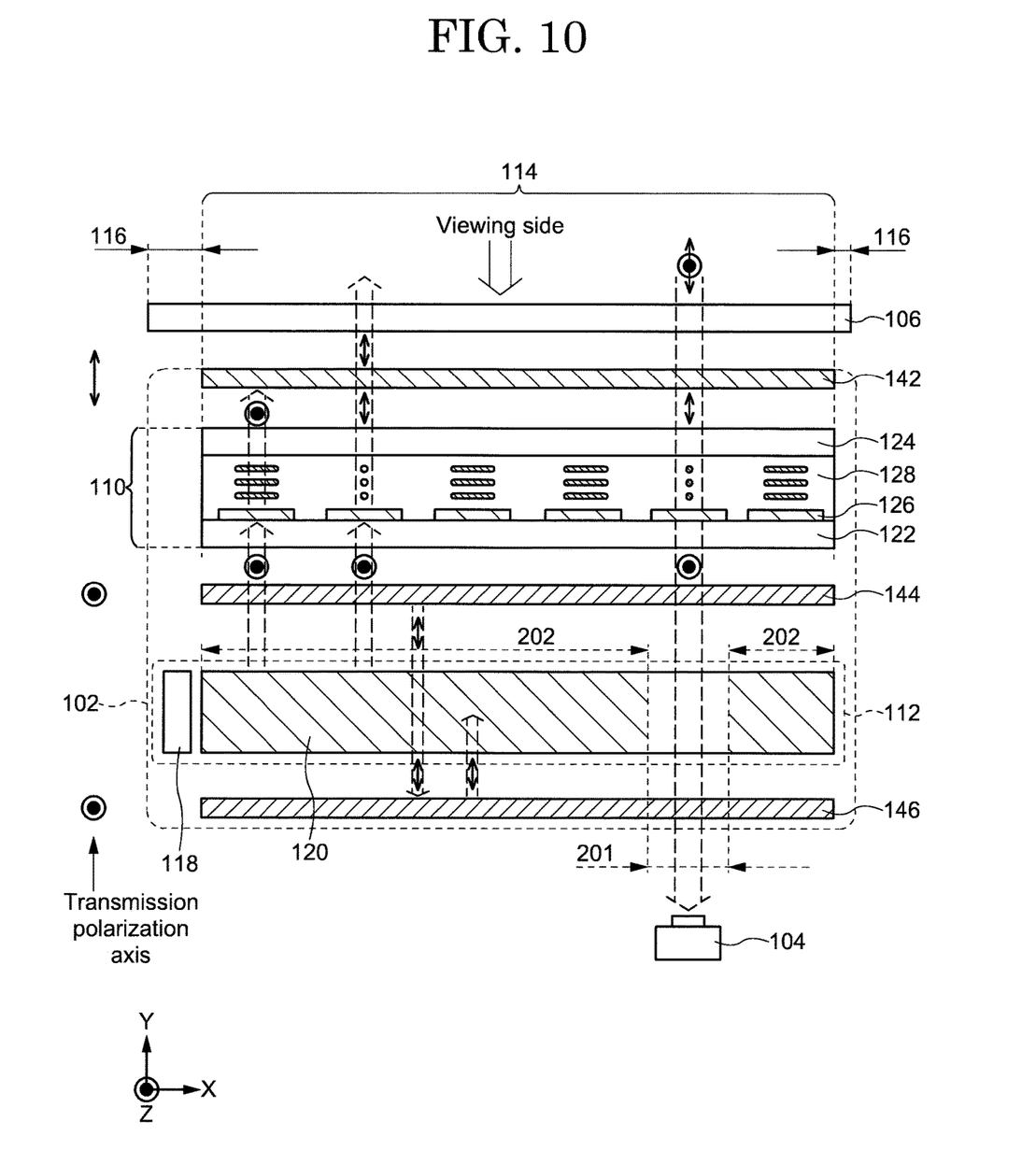
FIG. 10 is a diagram for explaining an operation of an electronic device according to an embodiment of the present invention.

FIG. 10 shows a state in which the voltage for orienting liquid crystal molecules is applied to pixels arranged in the region corresponding to the first region 201 overlapping the image sensor 104, and the optical modulation element 120 controls the first region 201 to be in the transparent state and the second region 202 to be in the scattering state. In this state, the polarization axis of the light passing through the transmissive polarizing plate 142 is twisted by 90 degrees, and the light passing through the liquid crystal display panel 110 is polarized in the same direction as the transmission polarizing axis of the first reflective polarizing plate 144. Since the first region of the optical modulation element 120 is controlled to be in a transparent state, the light transmitted through the first reflective polarizing plate 144 is transmitted through the optical modulation element 120. Further, since the transmission polarization axis of the second reflective polarizing plate 146 is arranged in parallel with the first reflective polarizing plate 144, the light passing through the optical modulation element 120 is incident on the image sensor 104. As a result, external light is incident on the image sensor 104, and the front direction of the liquid crystal display panel 110 can be imaged.

Thus, according to an embodiment of the present invention, it is possible to prevent the image sensor 104 from being affected by the illumination light by arranging the second reflective polarizing plate 146 between the lighting unit 112 and the image sensor 104. Further, the transmissive polarizing plate 142 and the first reflective polarizing plate 144 are disposed with the liquid crystal display panel 110 interposed therebetween with the transmission polarizing axes thereof being arranged in a cross Nicol manner, and the scattering state of the optical modulation element 120 is controlled in synchronization with the pixels, whereby the front direction of the liquid crystal display panel 110 can be imaged by the image sensor 104 while displaying an image.

Figure 11:
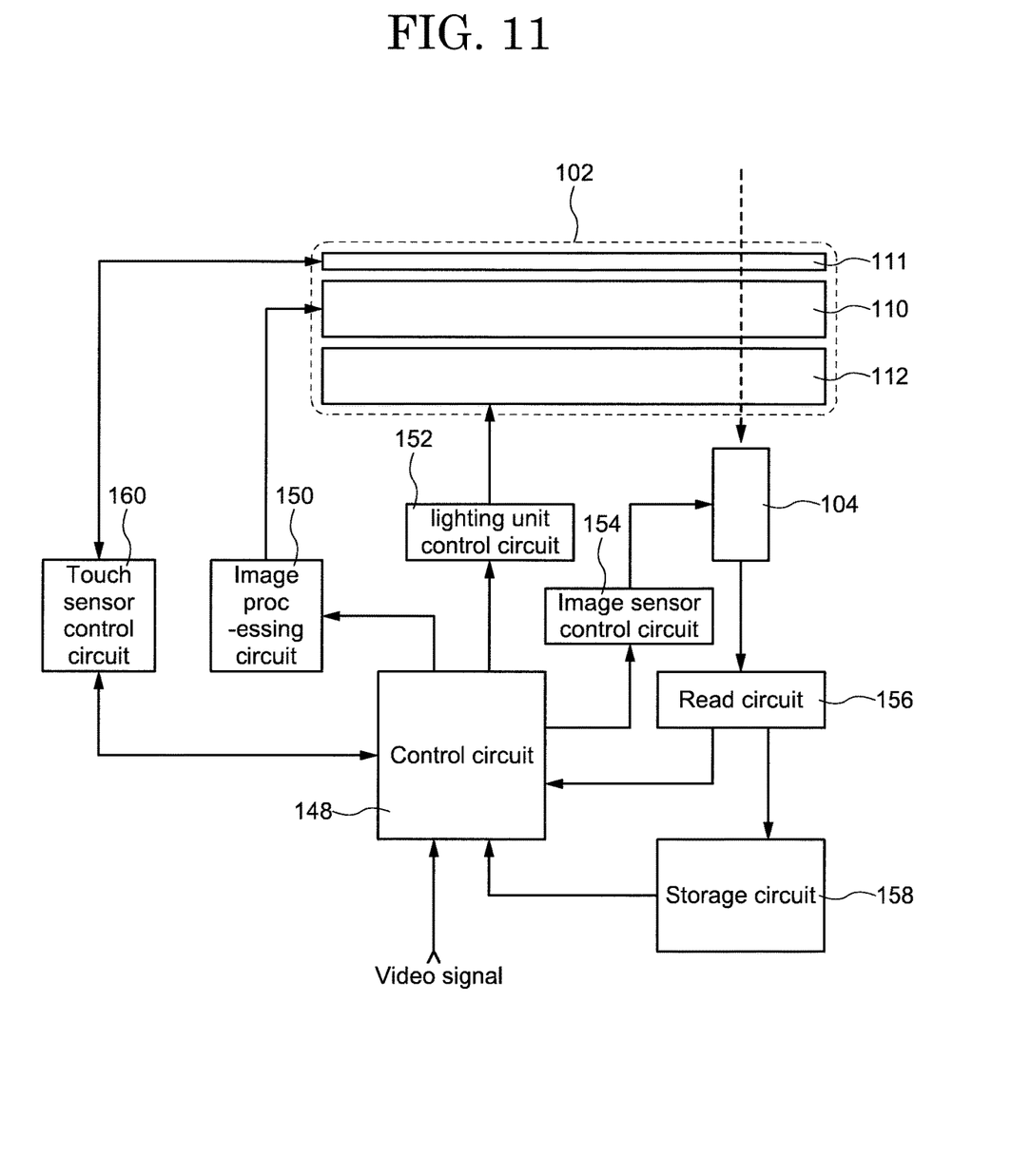
FIG. 11 is a block diagram showing a configuration of an electronic device according to an embodiment of the present invention.

FIG. 11 is a block diagram showing an example of the functional configuration of the electronic device 100. The electronic device 100 comprises the liquid crystal display device 102, the image sensor 104, a control circuit 148, an image processing circuit 150, a lighting unit control circuit 152, an image sensor control circuit 154, a readout circuit 156, a storage circuit 158, and a touch sensor control circuit 160. The liquid crystal display device 102 includes the liquid crystal display panel 110 and the lighting unit 112. The liquid crystal display device 102 includes a touch sensor 111 disposed on the liquid crystal display panel 110. The function of the touch sensor 111 may be integrated in the liquid crystal display panel 110.

The control circuit 148 operates based on an operating system. The control circuit 148 reads data from the storage circuit 158 and controls the image processing circuit 150 to display an image on the liquid crystal display panel 110. For example, the control circuit 148 outputs the data of the operating screen to the image processing circuit 150. The image processing circuit 150 operates to display the operating screen on the liquid crystal display panel 110 based on the operating screen data. The control circuit 148 receives a video signal acquired via a telecommunications line. The control circuit 148 outputs a video signal to the image processing circuit 150, and the image processing circuit 150 outputs the video signal to the liquid crystal display panel 110 to display images. The control circuit 148 also reads an application program from the storage circuit 158 and outputs data for executing the application program to the image processing circuit 150. The image processing circuit 150 outputs images to be displayed when the application program is executed to the liquid crystal display panel 110. When the control circuit outputs data for displaying images in the image processing circuit 150, the control circuit 148 outputs instructions for driving the lighting unit 112 to the lighting unit control circuit 152 so as to be synchronized with the data.

The touch sensor control circuit 160 drives the touch sensor 111 and outputs a detection signal to the control circuit 148. The control circuit 148 outputs data for rewriting the contents of the operating screen to the image processing circuit 150 based on the detection signal output from the touch sensor control circuit 160, and controls the execution state of the application program.

For example, when execution of the application program for imaging is selected by the touch sensor control circuit 160, the control circuit 148 outputs to the image processing circuit 150 an instruction for the liquid crystal display device 102 to shift to the imaging mode. The image processing circuit 150 outputs image data in which pixels in a region overlapping the image sensor 104 are displayed in white. The control circuit 148 also outputs an instruction to transition to the imaging mode to the lighting unit control circuit 152. The lighting unit control circuit 152 controls the lighting unit 112 so that a region overlapping the image sensor 104 is in a transparent state. The control circuit 148 outputs a control signal to the image sensor control circuit 154 in synchronization with the operations of the image processing circuit 150 and the lighting unit control circuit 152. The image sensor control circuit 154 drives the image sensor 104 based on the control signal.

The operations of the liquid crystal display device 102 and the image sensor 104 in the imaging mode are the same as those described with reference to FIG. 5 and FIG. 7. The image taken by the image sensor 104 is read out by the read circuit 156 and stored in the storage circuit 158. Further, the image data read by the read circuit 156 may be directly input to the control circuit 148, and displayed in real time by the liquid crystal display device 102 by the image processing circuit 150.

The control circuit 148 includes the image processing circuit 150, the lighting unit control circuit 152, the readout circuit 156, the touch sensor control circuit 160, and the image sensor control circuit 154, which are provided by an arithmetic processing unit formed by a semiconductor integrated circuit. Each of these functional blocks may be integrated in one CPU, or may be provided by mounting a plurality of dedicated integrated circuits such as a microprocessor and an image processing processor on a mother board. The storage circuit 158 is provided by a semiconductor memory. The semiconductor memory is realized by a volatile dynamic memory and a non-volatile flash memory.

As described above, according to one embodiment of the present invention, the optical modulation element 120 is used for the lighting unit 112, so that it is possible to provide a region which illuminates the liquid crystal display panel 110 and a region which does not illuminate crystal display panel 110. The optical modulation element 120 can form the state in which the front direction of the liquid crystal display panel 110 can be imaged by the image sensor 104 disposed to be overlapped on the region where the liquid crystal display panel 110 is not illuminated, by making the region transparent. With such a configuration, the electronic device 100 according to an embodiment of the present invention can be arranged with the image sensing device 104 on the back surface of the liquid crystal display panel 110. Thus, the electronic device 100 according to one embodiment of the present invention can be made narrower in the frame.

In one embodiment of the present invention, the electronic device 100 may include an optical sensor (Illuminance sensor and environmental light sensor) instead of the image sensor 104. Further, in one embodiment of the present invention, the electronic device 100 may include a plurality of regions in which the optical modulation element 120 is controlled to be in the transmission state, and the image sensor 104 and the optical sensor may be disposed, respectively. As a result, the image sensor 104 and the optical sensor need not be disposed in the frame portion of the housing 108, so that the frame can be narrowed.

What is claimed is:

1. An electronic device, comprising:
   a liquid crystal display panel having a display region disposed with a plurality of pixels;
   an image sensor disposed on a back side of the liquid crystal display panel and imaging a front direction through the liquid crystal display panel; and
   a lighting unit disposed between the liquid crystal display panel and the image sensor,
   a first reflective polarizing plate disposed on the lighting unit side of the liquid crystal display panel; and
   a second reflective polarizing plate disposed between the image sensor and an optical modulation element, wherein
   the image sensor is disposed in a region overlapping the display region, and
   the lighting unit includes the optical modulation element disposed to overlap with the display region and a light source for lighting the optical modulation element.

2. The electronic device according to claim 1, wherein the optical modulation element is configured to have a scattering state for scattering light emitted from the light source in the direction of the liquid crystal display panel, and a transmission state for making a region overlapping the image sensor transparent and maintaining the scattering state in other regions.

3. The electronic device according to claim 2, wherein the transmission state includes a partial transmission state for making a region overlapping the image sensor partly transparent.

4. The electronic device according to claim 2, wherein
when the optical modulation element is in the scattering state, a video image is displayed on the liquid crystal display panel, and
when the optical modulation element is in the transmission state, the liquid crystal display panel performs white display in a region overlapping the image sensor, and the image sensor performs imaging.

5. The electronic device according to claim 1, wherein the optical modulation element is a polymer dispersed liquid crystal panel.

6. The electronic device according to claim 1, further comprising a transmissive polarizing plate disposed on a side of the liquid crystal display panel opposite to the first reflective polarizing plate,
wherein
a transmission polarization axes of the first reflective polarizing plate and the transmissive polarizing plate are disposed in a crossed Nicol's manner, and
a transmission polarization axis of the first reflective polarizing plate and the second reflective polarizing plate are disposed in parallel.

7. A liquid crystal display device comprising:
a liquid crystal display panel having a display region disposed with a plurality of pixels;
a lighting unit disposed to overlap the liquid crystal display panel;
a first reflective polarizing plate arranged on the lighting unit side of the liquid crystal display panel; and
a second reflective polarizing plate disposed between an image sensor and an optical modulation element, wherein
the lighting unit includes the optical modulation element disposed to overlap the display region, and a light source for illuminating the optical modulation element, and
the optical modulation element is configured to partially form a scattering state and a transmission state in a region overlapping the display region.

8. The liquid crystal display device according to claim 7, wherein the optical modulation element is a polymer dispersed liquid crystal panel.

9. The liquid crystal display device according to claim 7, further comprising
a transmissive polarizing plate disposed on a side of the liquid crystal display panel opposite to the second reflective polarizing plate,
wherein
a transmission polarization axes of the first reflective polarizing plate and the transmissive polarizing plate are disposed in a crossed Nicol's manner, and
a transmission polarization axis of the first reflective polarizing plate and that of the second reflective polarizing plate are disposed in parallel.

* * * * *